US008318476B2

(12) United States Patent
Parker et al.

(10) Patent No.: US 8,318,476 B2
(45) Date of Patent: Nov. 27, 2012

(54) GAS TREATMENT SYSTEMS AND METHODS

(75) Inventors: Richard D. Parker, Poway, CA (US); Jennifer Romaine Miller, Houston, TX (US); David L. Morano, Sarasota, FL (US)

(73) Assignee: Siemens Industry, Inc., Alpharetta, GA (US)

(*) Notice: Subject to any disclaimer, the term of this patent is extended or adjusted under 35 U.S.C. 154(b) by 703 days.

(21) Appl. No.: 11/799,742

(22) Filed: May 2, 2007

(65) Prior Publication Data
US 2007/0259416 A1 Nov. 8, 2007

Related U.S. Application Data

(60) Provisional application No. 60/746,234, filed on May 2, 2006.

(51) Int. Cl.
*A61L 9/01* (2006.01)
*C02F 3/34* (2006.01)

(52) U.S. Cl. ............ 435/266; 435/289; 435/299.1; 435/176; 435/177; 435/180; 435/262; 435/262.5

(58) Field of Classification Search ............ 435/289.1, 435/299.1, 176, 177, 180, 262, 262.5, 266
See application file for complete search history.

(56) References Cited

U.S. PATENT DOCUMENTS

| 4,421,534 A | 12/1983 | Walker |
| 5,232,676 A | 8/1993 | Wolff et al. |
| 5,445,660 A | 8/1995 | Koers |
| 5,480,550 A | 1/1996 | Sublette |
| 5,858,768 A | 1/1999 | Bonnin et al. |
| 5,861,303 A * | 1/1999 | Barshter et al. ............ 435/266 |
| 6,087,159 A * | 7/2000 | Finn ............................ 435/299.1 |
| 6,168,711 B1 | 1/2001 | Teramachi et al. |
| 6,194,198 B1 | 2/2001 | Koers |
| 6,271,020 B1 * | 8/2001 | Coleman ...................... 435/266 |
| 6,283,309 B1 | 9/2001 | Koers |
| 6,358,729 B1 | 3/2002 | Ferranti |

(Continued)

FOREIGN PATENT DOCUMENTS

AT 411332 B 12/2003

(Continued)

OTHER PUBLICATIONS

David Gabriel et al., "Biotrickling Filters for POTWs Air Treatment: Full-Scale Experience with a Converted Scrubber," Odors and Toxic Air Emissions, 2002, Water Environmental Federation.

(Continued)

*Primary Examiner* — Nathan Bowers

(57) ABSTRACT

Systems and methods for biological and chemical gas treatment are disclosed. The systems may generally include a biological treatment zone and a chemical oxidation zone. An oxidizing agent subsystem may deliver an oxidizing agent, such as chlorine dioxide, to the chemical oxidation zone. The oxidizing agent subsystem may generate the oxidizing agent in situ from a product of the biological treatment zone. The oxidizing agent subsystem may include a reaction chamber and a source of a reactant, such as an alkaline metal chlorite reservoir. A controller may be in communication with various sensors and other components to generally manage operation of the disclosed systems.

24 Claims, 2 Drawing Sheets

U.S. PATENT DOCUMENTS

| | | | |
|---|---|---|---|
| 6,383,389 B1 | 5/2002 | Pilgram et al. | |
| 6,627,434 B1* | 9/2003 | McNelly | 435/290.1 |
| 2001/0034056 A1* | 10/2001 | Corey | 435/266 |
| 2005/0079124 A1* | 4/2005 | Sanderson | 423/477 |

FOREIGN PATENT DOCUMENTS

| | | |
|---|---|---|
| JP | 63-130122 A | 6/1988 |
| JP | 1-317525 A | 1/1989 |
| JP | 4-330915 A | 11/1992 |
| WO | 9811260 | 3/1998 |

OTHER PUBLICATIONS

David Gabriel et al., "Conversion of Full-Scale Wet Scrubbers to Biotrickling Filters for H2S Control at Publicly Owned Treatment Works," Journal of Environmental Engineering, Oct. 2004.

David Gabriel et al., "Technical and Economical Analysis of the Conversion of a Full-Scale Scrubber to a Biotrickling Filter for Odor Control," Water Science and Technology, 2004, IWA Publishing, vol. 50 No. 4 pp. 309-318.

* cited by examiner

GAS TREATMENT SYSTEMS AND METHODS

CROSS-REFERENCE TO RELATED APPLICATION

This application claims priority under 35 U.S.C. §119(e) to U.S. Provisional Application Ser. No. 60/746,234 entitled "CHLORINE DIOXIDE GENERATION FROM CHLORITE USING BIOSCRUBBER BLOW DOWN ACID," filed on May 2, 2006, which is hereby incorporated herein by reference in its entirety for all purposes.

BACKGROUND OF THE INVENTION

1. Field of the Invention

At least one embodiment of the present invention relates generally to removing undesirable constituents from fluid streams and, more specifically, to systems and methods for biologically and chemically treating gas streams.

2. Discussion of Related Art

Increased industrialization and population growth in urban settings over the past several decades have presented important environmental concerns. Significant design problems are associated with the purification and deodorization of effluent gas streams when public health and/or aesthetic considerations make it desirable to do so.

Various techniques have been developed in response to the need for removal of odorous constituents from effluent gas streams. As a general rule, an effective technique should be tailored to the particular compounds to be targeted. For example, in a sewage system environment, a primary cause of odor may be hydrogen sulfide. This compound is detectable by the human olfactory sense at very low concentrations. In addition to the unpleasant odor associated with it, hydrogen sulfide is noted for its toxicity and its capacity for corroding materials with which it comes in contact.

Hydrogen sulfide is not the only undesirable constituent found in effluent gases. Others, such as amines, mercaptans and organic acids can be produced from a variety of sources. Because of the undesirability of introducing such constituents into the atmosphere, communities and governmental agencies may formulate criteria for their regulation. A suitable gas treatment system, meeting such criteria, would substantially reduce the likelihood of any public nuisance or annoyance by removing, in a cost effective manner, substantial amounts of unwanted substances, preferably at or near the source of their production.

Removal of odorous constituents from a waste gas stream can be accomplished by several techniques. In the past, the treatment of polluted gases was performed mainly by means of chemical and physical processes. For example, processes involving incineration, absorption into a liquid phase, and adsorption onto a solid surface, such as activated carbon or charcoal, are well-established and reliable techniques.

Biological treatment has emerged as an alternative technology for odor control and has demonstrated an ability to successfully treat high flows of contaminated gas with high inlet pollutant concentrations. In such systems, a biomass of pollutant-degrading microorganisms is generally cultivated on the surface of media packing in a scrubber column. The conversion of pollutants to innocuous compounds is mediated by the microorganisms as the contaminated air is passed through the biological scrubber column.

BRIEF SUMMARY OF THE INVENTION

In accordance with one or more embodiments, the invention relates generally to systems and methods for biological and chemical gas treatment.

In accordance with one or more embodiments, the invention relates to a biochemical gas treatment system. The biochemical gas treatment system can comprise a scrubber comprising a process gas inlet, a treated gas outlet, a biological scrubber stage, a chemical oxidation scrubber stage, and a scrubber sump. The system can further comprise a reaction chamber having a first inlet fluidly connected to an outlet of the scrubber sump, and an outlet fluidly connected to the chemical oxidation stage. The system can still further comprise a reactant source fluidly connected to a second inlet of the reaction chamber.

In accordance with one or more embodiments, the invention relates to a gas treatment system. The gas treatment system can comprise a biological treatment zone comprising an inlet fluidly connectable to a source of process gas, and an outlet. The system can further comprise a chemical oxidation zone comprising an inlet fluidly connected to the biological treatment zone outlet. The system can still further comprise an oxidizing agent system constructed and arranged to deliver an oxidizing agent formed from a product of the biological treatment zone to the chemical oxidation zone.

In accordance with one or more embodiments, the invention relates to a method of treating a gas stream. The method can comprise biologically treating the gas stream to produce a first gas product and an acidic byproduct, generating an oxidizing agent from at least a portion of the acidic byproduct and a reactant, and chemically treating the first gas product with the oxidizing agent to produce a second gas product.

In accordance with one or more embodiments, the invention relates to a method of facilitating odor control. The method can comprise providing a biochemical gas treatment system comprising a biological treatment zone comprising an inlet fluidly connectable to a process gas source, and an outlet; a chemical oxidation zone comprising an inlet fluidly connected to the biological treatment zone outlet; and an oxidizing agent system constructed and arranged to deliver an oxidizing agent formed from a product of the biological treatment zone to the chemical oxidation zone. The method can further comprise connecting the biochemical odor treatment system inlet to the process gas source to reduce a concentration of at least one odorous process gas constituent.

In accordance with one or more embodiments, the invention relates to a method of modifying an existing biological gas treatment system having a treated gas outlet and a sump. The method can comprise connecting a chemical oxidation stage to the treated gas outlet of the biological gas treatment system, connecting a first inlet of a reaction chamber to the sump of the biological gas treatment system, connecting a second inlet of the reaction chamber to a source of a reactant, and connecting an outlet of the reaction chamber to an inlet of the chemical oxidation stage.

In accordance with one or more embodiments, the invention relates to a waste treatment system. The waste treatment system can comprise a wastewater treatment system. The waste treatment system can further comprise a gas treatment system comprising a scrubber comprising a process gas inlet fluidly coupled to a process gas outlet of the wastewater treatment system, a treated gas outlet, a biological scrubber stage, a chemical oxidation scrubber stage, and a scrubber sump. The gas treatment system can further comprise a reaction chamber having a first inlet fluidly connected to an outlet of the scrubber sump, and an outlet fluidly connected to the chemical oxidation stage. The gas treatment system can still further comprise a reactant source fluidly connected to a second inlet of the reaction chamber.

Other advantages, novel features and objects of the invention will become apparent from the following detailed description of the invention when considered in conjunction with the accompanying drawings.

BRIEF DESCRIPTION OF THE DRAWINGS

The accompanying drawings are not intended to be drawn to scale. In the drawings, each identical or nearly identical component that is illustrated in various figures is represented by like numeral. For purposes of clarity, not every component may be labeled in every drawing. Preferred, non-limiting embodiments of the present invention will be described with reference to the accompanying drawings, in which.

DETAILED DESCRIPTION OF THE INVENTION

Figure 1:
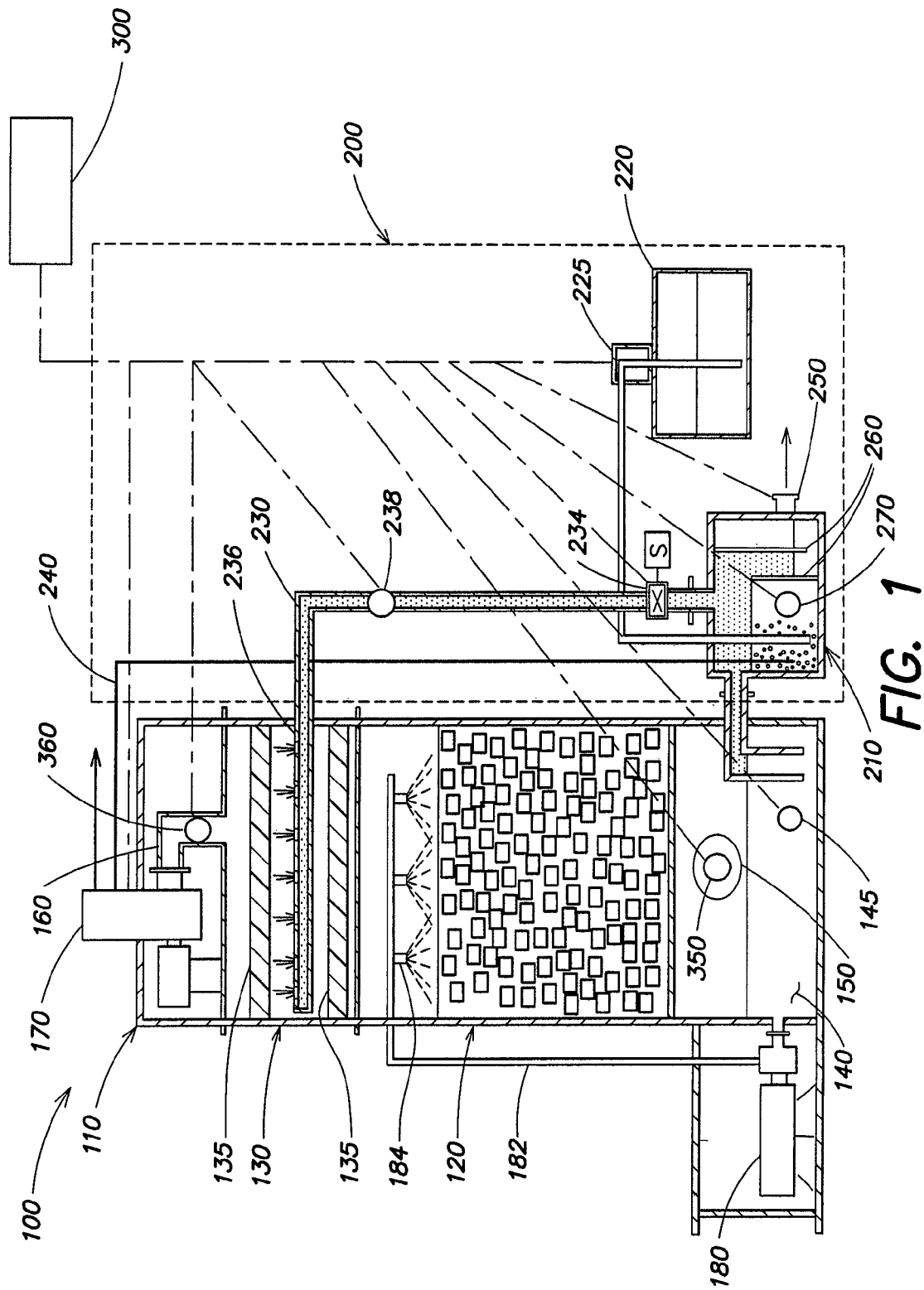
FIG. 1 schematically details an oxidizing agent system of a gas treatment system in accordance with one or more embodiments of the present invention.

This invention is not limited in its application to the details of construction and the arrangement of components as set forth in the following description or illustrated in the drawings. The invention is capable of embodiments and of being practiced or carried out in various ways beyond those exemplarily presented herein.

In accordance with one or more embodiments, the invention relates generally to systems and methods for treating gas streams. The disclosed systems and methods may be effective in providing comprehensive gas treatment by integrating biological and chemical techniques which are collectively capable of treating a wide range of undesirable constituents. Beneficially, the disclosed systems and methods may couple the biological and chemical processes so as to obviate the need to supply otherwise necessary precursor materials. The present disclosure recognizes the potential for synergy between biological and chemical techniques in a unified gas treatment approach. The result is improved gas treatment that is more efficient, economical and environmentally benign than conventional systems and methods. Operation of the disclosed systems may be controlled to meet requirements associated with particular applications, as well as to adapt in response to variations in operational conditions.

In typical operation, a disclosed gas treatment system may receive process gas from various sources, such as municipal waste treatment plants. Process gas may be moved through the system by an upstream or downstream operation, such as by being blown through the system by a blower, or pulled through the system by a fan. As used herein, the term "process gas" refers to any gas, bearing at least one undesirable constituent, deliverable to the gas treatment system for sanitization, purification and/or deodorization. The process gas may include substances either hazardous to human health and/or at least objectionable to people in the vicinity of the gas producing source. For example, in some embodiments, the process gas may be a sulfur-containing gas, including compounds such as hydrogen sulfide, methyl mercaptan, dimethyl sulfide, dimethyl disulfide, organic sulfides, and/or reduced sulfur compounds. In other embodiments, the process gas may include ammonia, amines, and/or other substances. The type and concentration of odorous constituents in the process gas stream may be site-specific and/or vary with time.

Referring now to the drawings and, more particularly to FIG. 1 thereof, a gas treatment system 100 is described which is constructed and arranged in accordance with one or more embodiments of the present invention.

Gas treatment system 100 may generally include at least one scrubber 110 constructed and arranged to receive a process gas stream at inlet 150 and to release a treated gas stream at outlet 160. Scrubber 110 may be made of any material chemically and physically compatible with anticipated environmental conditions. For example, in some embodiments the material of scrubber 110 may be fiberglass or polyethylene. The size and/or configuration of scrubber 110 may be dictated by factors such as, but not limited to, the type and concentration of odorous constituents present in the process gas, the desired degree of deodorization and the volumetric flow rate of process gas through system 100. Scrubber 110 may have any geometry, for example, round or rectangular, in cross-section, so as to provide sufficient residence time, surface contact and/or footprint to achieve a desired degree of mass transfer and/or conversion of odorous constituents to innocuous compounds within scrubber 110.

Scrubber 110 may include one or more treatment zones in which a gas stream is generally acted upon to reduce a concentration of at least one undesirable constituent therein. For example, scrubber 110 may include one or more treatment stages, such as scrubber stages 120, 130. Various scrubber stages may be fluidly connected therebetween. Multiple scrubber stages of a scrubber 110 may be arranged in series within a single scrubber column, as illustrated. Alternatively, one skilled in the art may recognize that scrubber stages 120, 130 may each reside in a separate scrubber column wherein multiple scrubber columns may be fluidly connected therebetween. A treatment zone may involve any chemical, physical, biological, or other type of process capable of acting upon a gas stream. A gas stream entering a treatment zone may typically differ from a gas stream exiting the treatment zone.

In accordance with one or more embodiments of the present invention, at least one treatment zone, such as scrubber stage 120, may be a biological treatment zone in which the conversion of pollutants to innocuous compounds is typically facilitated or mediated by microorganisms, such as bacteria. Different varieties of bacteria may target different odorous constituents. For example, bacteria such as *Thiobacillus thiooxydans, Thiobacillus thioparus* and *Thiobacillus intermedius* may be predominantly efficient in removing hydrogen sulfide. Without wishing to be bound to any particular theory, promoting the presence of a broad range of bacteria within biological scrubber stage 120 may facilitate conversion of a broad range of odorous compounds. Likewise, it may also be possible to selectively promote bacterial activity within biological scrubber stage 120 to target particular undesirable compounds. The composition of a bacterial population may be effected by factors including, for example, pH levels, temperature, dissolved oxygen levels, and the types and concentrations of nutrients present in the surrounding environment.

Biological scrubber stage 120 may generally involve a fixed biomass, such as a biofilm, of pollutant-degrading or converting microorganisms cultivated on, for example, the surface of media packing. The conversion of pollutants to innocuous compounds is typically facilitated or mediated by the microorganisms as the contaminated process gas is passed through biological scrubber stage 120. For example, bacteria within the biological scrubber stage 120 may be effective in oxidizing odorous compounds. Biological scrubber stage 120 may comprise media packing to promote attachment of the biomass. The media packing may be supported by a media support plate and comprise any media generally capable of supporting biological activity, typically inert to the byproducts of any biological reaction occurring therein. For example, in some embodiments of the invention, a thermoplastic media packing such as open-pore polyurethane foam with high specific surface area may be used as the media packing. Other considerations in selecting the media packing may include resistance to plugging, flow capacity and associated pressure drop. The depth of biological scrubber stage 120 may be site-specific to provide sufficient media surface area and residence time to treat the process gas. Prevention of media compression may be an additional consideration in establishing the depth of biological scrubber stage 120.

Figure 2:
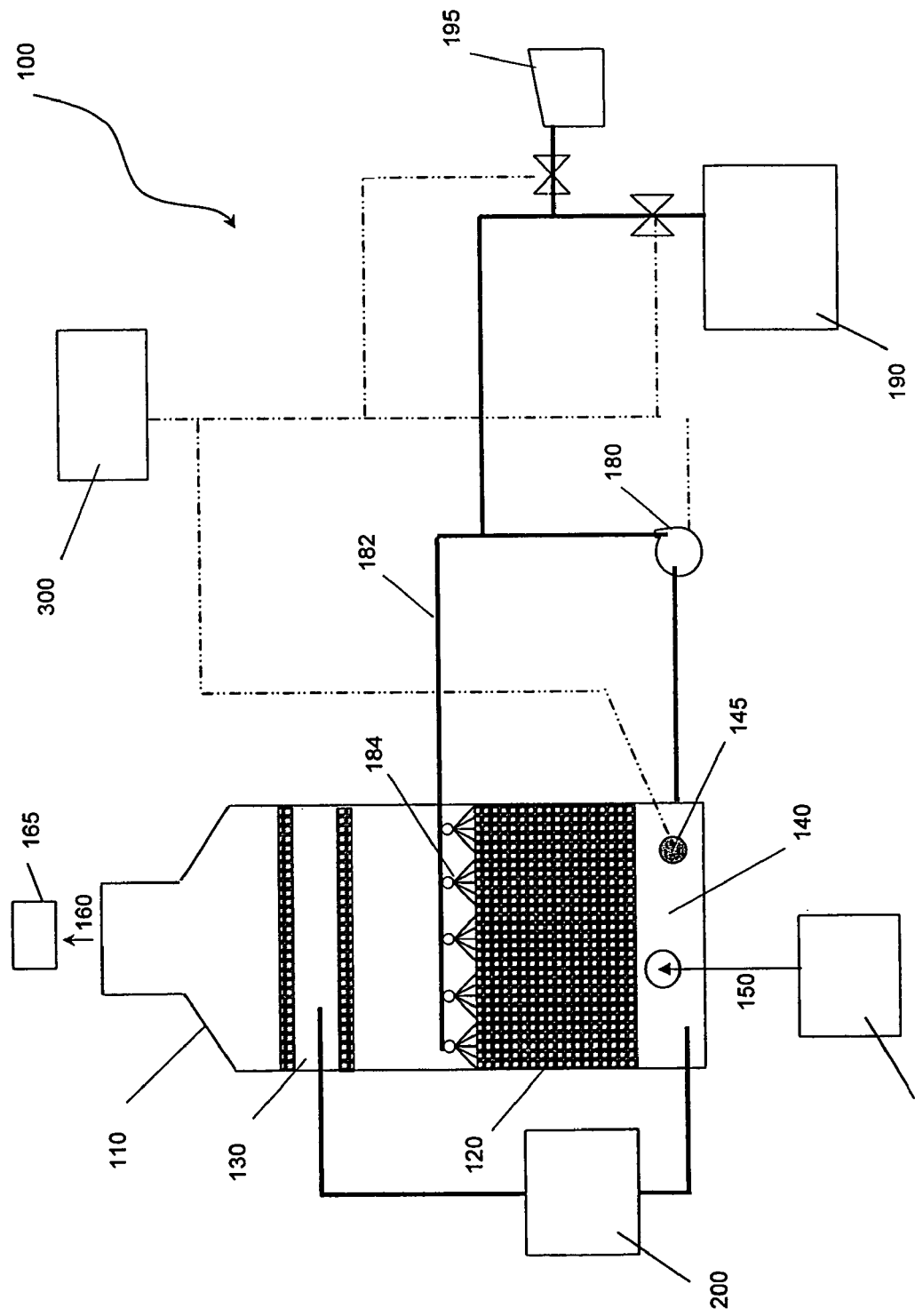
FIG. 2 schematically illustrates a gas treatment system coupled to a wastewater treatment system in accordance with one or more embodiments of the present invention.

As illustrated in FIG. 2, gas treatment system 100 may typically include an irrigation source 190 disposed to provide irrigation fluid used to generally promote growth of biomass by wetting biological scrubber stage 120. As used herein, the irrigation fluid can be, for example, water from any commonly known source. An additive may be utilized to adjust characteristics of the irrigation fluid, such as pH, if desired. Scrubber 110 can also include a scrubber sump 140 capable of collecting irrigation fluid which has passed through scrubber stage 120. In some embodiments, sump 140 may be fluidly connected to biological scrubber stage 120. Where system 100 includes multiple scrubbers 110, a common sump 140 may service all scrubbers 110, or, alternatively, each scrubber 110 can have a dedicated sump 140. In some embodiments, a level sensor, such as an ultrasonic level indicator, may be positioned to detect a liquid level within sump 140.

As illustrated in FIG. 2, gas treatment system 100 may include features for moving irrigation fluid through biological scrubber stage 120, such as from irrigation source 190. For example, an irrigation pump 180 may aid in the delivery of irrigation fluid to scrubber stage 120. In some embodiments, system 100 may also include a recirculation system. Irrigation fluid collecting in scrubber sump 140 may be recycled or recirculated to biological scrubber stage 120 along a liquid circuit, for example, by irrigation pump 180 via recirculation line 182. As used herein, the term liquid circuit is intended to define a particular connection and arrangement of valves and lines that allows a liquid stream to flow therein. One or more features of the recirculation system may ensure uniform allocation and/or delivery of irrigation liquid across scrubber stage 120. For example, the recirculation system may include one or more spray nozzles 184 and/or a distributor plate (not shown).

The recycled irrigation fluid may distribute through the media packing of biological scrubber stage 120, providing moisture to the bacteria and rinsing away acidic byproducts of the biological reactions to scrubber sump 140 for further recycling. Thus, the pH level in the biological scrubber stage 120 may be maintained at a low level by the recirculation of acidic byproducts, providing an environment favorable to, for example, sulfur-oxidizing bacteria. The recirculation flow rate can be adjusted, such as based on the cross-sectional area of biological scrubber stage 120, in order to provide at least partial wetting thereof.

As discussed in greater detail below, irrigation fluid may generally be purged from system 100 in addition to being recirculated. For example, a discharge stream may purge irrigation fluid, either continuously or intermittently, so as to regulate the concentration of byproducts and pH within scrubber 110. Makeup water from irrigation source 190 may be added to compensate for the discharged irrigation fluid and to refresh the circulating supply of irrigation fluid. The pH level of the irrigation fluid in scrubber sump 140 may also be controlled by adding a compound, such as sodium hydroxide. Irrigation source 190 may be refilled simultaneously as it is drained or, for example, at regular intervals. Refilling may be done manually. Alternatively, a controller 300 can be implemented in communication with high and/or low level switches within irrigation source 190 to actuate valves to refill irrigation source 190 with, for example, plant water or secondary plant effluent.

A nutrient may be added to the irrigation fluid to promote and enhance the growth of bacteria capable of targeting odorous constituents. For example, the nutrient may be a commercially available, balanced fertilizer designed to enhance the growth of sulfur-oxidizing bacteria. The nutrient can include compounds such as phosphorous, nitrogen and sulfate. Yeast, thiosulfate and chelated iron may also be present. The nutrient may be added to the discharge stream of irrigation pump 180 via nutrient reservoir 195 as illustrated in FIG. 2. Any rate of nutrient addition may be employed to sustain a desired bacterial activity. The feed rate may be set proportional, for example, to the rate at which hydrogen sulfide is removed from the process gas stream. The rate of delivery may be controllable through manual adjustment of the speed and stroke of a nutrient feed pump associated with nutrient supply 195. Alternatively, a controller 300 may be used to automatically control the addition of the nutrient.

Prior to normal operation of gas treatment system 100, the media packing of biological scrubber stage 120 is typically inoculated with bacteria to develop a biomass. For example, cultured bacteria, an activated sludge containing a multitude of bacteria, or other source of bacteria may be supplied to scrubber column 110. The scrubber 110 may be filled with irrigation fluid from irrigation source 190, and the irrigation fluid may be recycled from scrubber sump 140 to biological scrubber stage 120 during a bacterial colony-establishing period of acclimation. In some embodiments, acclimation may last about one week.

During acclimation, process gas may be introduced into scrubber 110 at inlet 150 initially at a reduced flow rate, such as about 25-50% of the design process gas flow rate, thereafter ramping up as biomass develops. In embodiments wherein media packing of biological scrubber stage 120 contains no organic carbon for the bacteria to feed on, the autotrophic bacteria that can metabolize constituents of the process gas will begin to dominate. Thus, colonies of bacteria that use, for example, sulfur-containing compounds as their primary energy source will likely propagate due to the availability of constituents such as sulfur compounds in the process gas stream. At such conditions, the pH level typically should begin to fall as sulfuric acid is likely produced by the autotrophic bacteria. Initially, the extent of odor removal may be relatively low, but the performance typically should increase with time and can reach over 99% after, for example, about three to four weeks when the bacteria colony should be fully established. A carbon bed or other polishing unit may be attached to outlet 160 to further treat process gas discharged from scrubber 110, typically until system 100 is operating at full capacity. The bacteria population may change in response to shifts in the type and concentration of odorous constituents present in the process gas.

In accordance with one or more embodiments of the present invention, at least one treatment zone, such as scrubber stage 130, may be a chemical treatment zone in which the concentration of at least one undesirable constituent in a process gas may be reduced through reaction with one or more supplied chemicals. The utilized chemical(s) may be selected based on factors including environmental impact and the types of pollutants to be targeted. For example, it may be desirable to treat residual target compounds exiting biological scrubber stage 120 and/or other compounds. While embodiments of the present invention involving both a biological treatment zone and a chemical treatment zone may be referred to herein as a biochemical scrubber or a biochemical system, it should be recognized that distinct processes are occurring in each zone. For example, biological oxidation may occur within a biological scrubber stage while chemical oxidation may occur within a chemical scrubber stage.

In some embodiments, scrubber stage 130 may be a chemical oxidation zone, such as a chemical oxidation scrubber stage, to which an oxidizing agent may be provided as a reactant. The oxidizing agent utilized may be selected to specifically target one or more undesirable constituents in the process gas. In some embodiments, chemical oxidation scrubber stage 130 may be a dry oxidation scrubber stage, utilizing a gaseous oxidizing agent. For example, in some embodiments chlorine dioxide may be used as an oxidizing agent within chemical oxidation scrubber stage 130. In at least one embodiment, chlorine dioxide may be used as an oxidizer rather than as a disinfectant. Without wishing to be bound by any particular theory, chlorine dioxide may be a desirable oxidizing agent in at least some embodiments due to its selective nature, tending to target reduced inorganic and organic sulfur compounds and other reactive organic odors. Chlorine dioxide is also weak enough so as not to form noxious or hazardous byproducts.

In some embodiments, chemical oxidation scrubber stage 130 may generally define an oxidation chamber in which a process gas may contact an oxidizing agent. Chemical oxidation scrubber stage 130 may generally be sized, constructed and/or arranged to provide sufficient residence time therein to facilitate oxidation of target compounds. Chemical oxidation scrubber stage 130 may also include one or more features intended to promote adequate mixing between a process gas and an oxidizing agent. For example, in some embodiments, chemical oxidation scrubber stage 130 may include a stirrer, blower or similar device. In some embodiments, a mechanism or technique utilized for introducing oxidizing agent to the chemical oxidation scrubber stage 130 may facilitate mixing therein, such as through selective orientation of inflow piping. For example, oxidizing agent may be supplied via a crisscross array of piping.

In accordance with one or more embodiments, chemical oxidation scrubber stage 130 may be positioned downstream of biological scrubber stage 120. Without wishing to be bound by any particular theory, certain oxidizing agents, oxidation products and/or liquids such as condensation present within chemical oxidation scrubber stage 130 may be harmful to the biomass of biological scrubber stage 120. Thus, chemical oxidation scrubber stage 130 may include one or more features intended to adequately prevent exposure of the biomass to such compounds. For example, in some embodiments, chemical oxidation scrubber stage 130 may include one or more boundary layers 135 constructed and arranged to limit passage between biological scrubber stage 120 and chemical oxidation scrubber stage 130. Boundary layer 135 may generally allow passage of process gas upwards through chemical oxidation scrubber stage 130 but may effectively block passage of liquids and other fluids that may be harmful to the biomass. In some embodiments, boundary layer 135 may be an absorptive layer, such as a mesh pad. In at least one embodiment, boundary layer 135 may be made of a polypropylene material. A boundary layer 135 may also be positioned near an outlet of the chemical oxidation scrubber stage 130 to generally trap moisture as treated gas exits chemical oxidation scrubber stage 130.

In accordance with one or more embodiments, the oxidizing agent supplied to chemical oxidation scrubber stage 130 may be generated in situ within gas treatment system 100. Gas treatment system 100 may contain features directed to generating an oxidizing agent from an acid and other reactant. For example, in at least one embodiment, gas treatment system 100 may produce chlorine dioxide in situ by mixing an acid and a reactant. In some embodiments, the chlorine dioxide may be produced by reaction of sulfuric acid and a metal chlorite, such as sodium or potassium chlorite, or a metal chlorate.

As detailed in FIG. 1, one or more embodiments of gas treatment system 100 may generally include an oxidizing agent system 200 constructed and arranged to deliver an oxidizing agent formed from a product of the biological treatment zone 120 to the chemical oxidation zone 130. In at least one embodiment, oxidizing agent system 200 may generally include a reaction chamber 210 fluidly connected to sump 140 of scrubber 110. The fluid connection therebetween may generally be constructed and arranged such that irrigation fluid collected in sump 140 may overflow, such as via gravity, to reaction chamber 210 while preventing backflow.

Without wishing to be bound by any particular theory, irrigation fluid collected in sump 140 may have a low pH due to acidic byproducts therein from biological scrubber stage 120. In some embodiments, irrigation fluid in sump 140 may contain sulfuric acid and/or other acids. For example, the irrigation fluid may have a pH level between about 2 and 3, generally low enough to adequately convert chlorite to chlorine dioxide. Thus, oxidizing agent may be generated in situ using a waste stream of biological treatment zone 120 without the addition of precursor chemicals such as chlorine, sodium hypochlorite or acids.

Reaction chamber 210 may also be fluidly connected to a reactant source 220. In some embodiments, reactant source 220 may include a source of a metal chlorite or chlorate, such as alkali metal chlorites and alkaline earth metal chlorites. In at least one embodiment, reactant source 220 comprises a source of sodium or potassium chlorite. In some embodiments, a buffered or stabilized chlorite solution may also be used. The concentration of reactant in reactant source 220 may vary. Lower concentrations may generally be less hazardous. A dosing mechanism 225, for regulating flow of reactant from reactant source 220 to reaction chamber 210 may also be provided. For example, dosing mechanism 225 may be implemented utilizing flow regulators, pumps or valves such as needle valves, ball valves, angle-seat valves, butterfly valves, check valves, elliptic valves, metering valves, pinch valves, proportioning valves, solenoid valves pressure and/or temperature compensated variable flow valves. In one embodiment, dosing mechanism 225 may comprise a peristaltic pump.

In accordance with one or more embodiments, an outlet of the reaction chamber may be fluidly connected to an inlet of chemical oxidation scrubber stage 130. An oxidizing agent distribution system including piping 230 and distributor 236 may generally carry oxidizing agent, such as chlorine dioxide, from reaction chamber 210 to chemical oxidation scrubber stage 130. In some embodiments, one or more components configured to facilitate flow of process gas through scrubber column 110, such as fan 170 may facilitate movement of oxidizing agent along the oxidizing agent distribution system, such as by suction. Distributor 236 may generally be constructed and arranged so as to promote mixing of oxidizing agent with process gas within chemical oxidation scrubber stage 130, such as through the crisscross piping array discussed above. A valve 234, such as a solenoid valve, may generally regulate flow of oxidizing agent to chemical oxidation scrubber stage 130. In some embodiments, valve 234 may be in communication with a controller 300 of system 100. Valve 234 may be configured to be sensitive to flow rate of process gas through scrubber 110. For example, valve 234 may be configured so as to automatically close for safety if fan 170 shuts down. Valve 234 may also be responsive to concentration of undesirable constituents within a process gas stream.

Residence time of reactants within reaction chamber 210 may be controlled via one or more baffles 260 within reaction chamber 210. Height, orientation and/or position of baffles 260 may be strategically selected to impact residence time. Residence time may also be controlled via manipulation of discharge rate at drain 250. As discussed above, irrigation fluid may be purged from system 100, such as to control pH level and/or the concentration of waste products. While drain 250 may be positioned at any location within system 100, in at least one embodiment drain 250 may be located within reaction chamber 210. Beneficially, discharge from reaction chamber 210 at drain 250 may have an elevated pH and thus be less corrosive because irrigation fluid may have mixed with alkaline reactants such as alkaline metal chlorites from reactant source 220. Furthermore, discharge from reaction chamber 210 at drain 250 may contain residual chlorite which may provide additional sulfide control in a sewer system to which the waste stream is discharged. In some embodiments, discharge rate at drain 250 may be adjusted in conjunction with that of fresh makeup irrigation fluid being supplied from irrigation source 190.

In accordance with one or more embodiments, oxidizing agent system 200 may include one or more features to facilitate releasing oxidizing agent into the gaseous phase. For example, sparger 240 may deliver air bubbles to reaction chamber 210. In some embodiments, sparger 240 may be effective in releasing chlorine dioxide gas for delivery to chemical oxidation scrubber stage 130. In one embodiment, sparger 240 may be configured to deliver treated gas exiting scrubber 110 to reaction chamber 210.

In typical operation of gas treatment system 100, process gas may enter scrubber 110 at inlet 150 for treatment and exit via outlet 160. Scrubber 110 may include one or more components configured to facilitate flow of process gas through scrubber column 110, such as fan 170. A source of process gas to be treated, such as a source of gas containing hydrogen sulfide and/or other undesirable constituents, may be fluidly connected to process gas inlet 150. In some embodiments, the process gas may flow through biological scrubber stage 120 and then through chemical oxidation scrubber stage 130 in series. For example, process gas may flow vertically upwards through the first scrubber stage 120 and then through the second scrubber stage 130. In other embodiments, flow patterns which alternate counter-current and co-current contact may be implemented when multiple scrubber stages are present. Additional flow patterns within scrubber 110 are envisioned beyond those exemplarily discussed and presented herein. At least a portion of irrigation fluid collected in scrubber sump 140 may flow to reaction chamber 210. Oxidizing agent, such as chlorine dioxide, generated therein may be delivered to chemical oxidation scrubber stage 130.

In accordance with one or more embodiments, biological scrubber stage 120 may generally be maintained at a desired pH level to selectively promote growth of bacteria capable of targeting specific undesirable constituents as discussed above. For example, biological scrubber stage 120 may be maintained at a low pH level, such as through recirculation of irrigation fluid carrying acidic byproducts, to promote the growth of bacteria predominantly efficient in removing, at least partially, hydrogen sulfide, such as *Thiobacillus thiooxydans, Thiobacillus thioparus* and *Thiobacillus intermedius*. In some embodiments, chemical oxidation scrubber stage 130 may then serve as a polishing stage, capable of removing residual target constituent as well as other odorous constituents present in the process gas. For example, the second scrubber stage 130 may remove residual target constituents, for example, hydrogen sulfide, as well as other odorous components such as mercaptans, inorganic and organic sulfur compounds and other reactive compounds from the process gas stream.

In accordance with one or more embodiments of the present invention, gas treatment system 100 may also include a controller 300 for adjusting or regulating at least one operating parameter of the system or a component of the system, such as, but not limited to, actuating valves and pumps as illustrated. The controller 300 may be implemented using one or more computer systems. The computer system may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the computer system may include specially-programmed, special-purpose hardware, for example, an application-specific integrated circuit (ASIC) or controllers intended for fluid treatment systems.

The computer system can include one or more processors typically connected to one or more memory devices, which can comprise, for example, any one or more of a disk drive memory, a flash memory device, a RAM memory device, or other device for storing data. Memory is typically used for storing programs and data during operation of gas treatment system 100 and/or the computer system. For example, memory may be used for storing historical data relating to the parameters over a period of time, as well as operating data. Software, including programming code that implements embodiments of the invention, can be stored on a computer readable and/or writeable nonvolatile recording medium, and then typically copied into memory wherein it can then be executed by the processor. Such programming code may be written in any of a plurality of programming languages, for example, Java, Visual Basic, C, C#, or C++, Fortran, Pascal, Eiffel, Basic, COBAL, or any of a variety of combinations thereof.

Components of the computer system may be coupled by one or more interconnection mechanisms, which may include one or more busses (e.g., between components that are integrated within a same device) and/or a network (e.g., between components that reside on separate discrete devices). The interconnection mechanism typically enables communications (e.g., data, instructions) to be exchanged between components of the computer system.

The computer system can also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that can connect the computer system to a communication network (in addition or as an alternative to the network that may be formed by one or more of the components of the computer system).

According to one or more embodiments of the invention, the one or more input devices may include sensors for measuring parameters of the gas treatment system 100 and/or components thereof. Alternatively, the sensors, the metering valves and/or pumps, or all of these components may be connected to a communication network that is operatively coupled to the computer system. For example, one or more scrubber stages and/or components thereof, may be configured as input devices that are connected to the computer system. Any one or more of the above may be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms may be effected by utilizing any suitable technique including but not limited to those utilizing wireless protocols.

The controller 300 can include one or more computer storage media such as readable and/or writeable nonvolatile recording medium in which signals can be stored that define a program to be executed by one or more processors. The storage medium may, for example, be a disk or flash memory. In typical operation, the processor can cause data, such as code that implements one or more embodiments of the invention, to be read from the storage medium into a memory that allows for faster access to the information by the one or more processors than does the storage medium. The memory is typically a volatile, random access memory such as a dynamic random access memory (DRAM) or static memory (SRAM) or other suitable devices that facilitates information transfer to and from the processor.

Although a computer system is discussed by way of example as one type of computer system upon which various aspects of the invention may be practiced, it should be appreciated that the invention is not limited to being implemented in software, or on the computer system as exemplarily discussed. Indeed, rather than implemented on, for example, a general purpose computer system, the controller 300, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by controller 300 can be performed in separate computers, which in turn, can be communication through one or more networks.

In accordance with one or more embodiments, gas treatment system 100 may include one or more sensors in communication with controller 300 to facilitate monitoring and regulating the operating conditions of gas treatment system 100, including its components. Various types of sensors may be strategically positioned within system 100 to monitor one or more operational parameters and/or operating conditions of system 100. For example, sensors for temperature, pH, pressure drop, and flow rate may be incorporated at different points to facilitate system monitoring. More specifically, pH sensors 145 and 270 may be configured to detect a pH level of a liquid in sump 140 and reaction chamber 210, respectively. Sensors 350 and 360 may be configured to detect flow rate and/or concentration of odorous constituents such as hydrogen sulfide at inlet 150 and outlet 160, respectively. Sensor 238 may be configured to detect a concentration of oxidizing agent, such as chlorine dioxide, entering chemical oxidation scrubber stage 130. Information collected by such sensors may signal that system maintenance is required, or that one or more operational parameters should be adjusted for optimization and/or to meet established requirements.

In accordance with one or more embodiments, data from various sensors may be communicated to controller 300 to facilitate adjusting or regulating at least one operating parameter of system 100 or a component thereof, such as, but not limited to, actuating valves and pumps. Controller 300 may be in communication with various valves and pumps of system 100 and may provide control signals thereto. For example, if pH sensors 145 and/or 270 register a high pH, supplemental acid may be added by controller 300 to reaction chamber 210 to facilitate oxidizing agent generation. If pH sensors 145 and/or 270 register too low of a pH, discharge at drain 250 and/or rate of addition of fresh irrigation fluid from source 190 may be adjusted by controller 300, such as to maintain the pH level within a predetermined range. It is believed that too low of a pH level may kill or inactivate desirable bacteria. If sensor 238 registers a low concentration of oxidizing agent being supplied to chemical oxidation scrubber stage 130, then supplemental oxidizing agent may be provided, or supply of reactants to reaction chamber 210 and/or residence time therein may be adjusted by controller 300. If flow rate at inlet 150 increases, or if a concentration of an undesirable constituent exceeding a threshold value is detected at outlet 160, then adjustments may be made by controller 300 to increase oxidizing agent production or controller may direct an exiting treated gas stream to a polishing system as discussed below. Other control regimes may be implemented by one skilled in the art given the benefit of this disclosure.

It should be appreciated that numerous alterations, modifications and improvements may be made to the illustrated systems and methods. Although various embodiments exemplarily shown have been described as using sensors and controllers, it should be appreciated that the invention is not so limited. For example, rather than requiring any electronic or electro-mechanical sensors, the measurement of levels could alternatively be based upon the senses of an operator and likewise, an operator may manually provide desired system control. Manual operation may be the most practical in certain applications, such as where the type and concentration of undesirable constituents in the process gas stream is typically a constant at any given gas treatment site.

In accordance with one or more embodiments, a secondary polishing system 165 may be connected downstream of the scrubber outlet 160 to remove residual odorous constituents from the process gas stream when necessitated or desired as illustrated in FIG. 2. The secondary polishing system 165 may be a chemical scrubber, a biological scrubber, an adsorption media bed, other unit operation, or a combination thereof. For example, a carbon bed containing activated carbon media may be attached to processed gas outlet 160. Secondary polishing system 165 may be sized, for example, to provide a surface area consistent with a desired degree of polishing.

The invention contemplates the modification of existing facilities to retrofit one or more systems, or components in order to implement the techniques of the invention. Thus, for example, an existing facility can be modified to include a controller executing instructions in accordance with one or more embodiments exemplarily discussed herein. Alternatively, existing control systems can be reprogrammed or otherwise modified to perform any one or more acts of the invention. Existing scrubber systems can be converted to biochemical scrubber systems in accordance with systems and techniques described herein utilizing at least some of the preexisting equipment such as the shell, packing support and wetted parts. For example, existing biological gas treatment systems, such as that described in co-pending U.S. patent application Ser. No. 11/350,358 to Parker et al., which is hereby incorporated herein by reference in its entirety for all purposes, may be retrofitted in accordance with one or more embodiments of the present invention.

The invention further contemplates that at least portions of the disclosed gas treatment systems may be skid-mounted to enable pre-packaging and provide portability and/or facilitate retrofitting capabilities. Various system components described herein may be integrated in a single column. In another embodiment, individual components of system 100, such as irrigation source 190, nutrient reservoir 195, sump 140 and/or oxidizing agent system 200 may be configured in such a way as to serve multiple scrubbers 110.

One or more gas treatment systems may be connected to multiple sources of process gas or process gases. Gas treatment system 100 may treat a process gas stream wherein the type and concentration of odorous constituents is not constant. More specifically, the ideal mode of operating odor control system 100 may vary with time. Odor control system may adapt to these changing conditions through manual control. Alternatively, controller 300 may monitor the type and concentration of odorous constituents present in the process gas to determine and select the ideal operational parameters. Monitoring and adjustment of operational parameters may be continuous or performed at regular time intervals.

In certain embodiments, gas treatment system 100 may be part of a larger overall waste treatment system. For example, the waste treatment system may contain a wastewater treatment system 400 and a gas treatment system 100 as described herein and illustrated in FIG. 2. The wastewater treatment system may, for example, be a biological wastewater treatment system such as one including an aeration basin. In typical operation, the wastewater treatment system may receive wastewater from a community, industrial or residential source. For example, the wastewater may be delivered from a municipal or other large-scale sewage system. Alternatively, the wastewater may be generated, for example, by food processing or pulp and paper plants. Undesirable constituents including nitrate, nitrite, phosphorous, ammonia, and the like may typically be present in the wastewater. The conversion of these pollutants to innocuous compounds may be facilitated or mediated by microorganisms as the wastewater is passed through wastewater treatment system 400. Gas effluent streams are typically generated by wastewater treatment system 400 which may then be provided to gas treatment system 100 at inlet 150.

The function and advantages of these and other embodiments of the invention can be further understood from the prophetic example presented below, which illustrates the benefits and/or advantages of the systems and methods of the invention but does not exemplify the full scope of the invention.

Prophetic Example. Performance of a Biochemical Gas Treatment System.

A gas treatment system will be designed substantially in accordance with one or more embodiments of the invention as described above and illustrated in the figures. In this example, a biochemical scrubber will be operated to investigate the removal of hydrogen sulfide, inorganic and organic reduced sulfur compounds, other undesirable constituents and odor, as a function of various operational parameters. Operational parameters such as flow rates, residence times, irrigation rate for the biological treatment zone, pH levels in the scrubber sump and/or reaction chamber, chemical dosing rate to the reaction chamber, and concentration of the reactants supplied to the reaction chamber, will be manipulated to identify conditions for optimum performance as well as to establish basic operating procedures that will maintain a steady state condition.

An existing biological scrubber including a biological scrubber stage will be modified to include a chemical oxidation scrubber stage downstream of the biological scrubber stage. The biological scrubber stage will already contain primed media packing inoculated with bacteria. A reaction chamber will be fluidly connected to a sump of the biological scrubber, and an outlet of the reaction chamber will be fluidly connected to an inlet of the chemical oxidation scrubber stage to facilitate delivery of oxidizing agent. A source of a reactant, such as sodium chlorite, will be fluidly connected to the reaction chamber. The scrubber tower will be about 3 feet in diameter. The biological scrubber stage will be about 4 feet in height while the chemical oxidation scrubber stage will be about 2 feet in height.

After initial start-up, the system will be operated mechanically on fresh air for a time required to provide reliable mechanical operation. Following the mechanical start-up, odorous process gas will be introduced and the system will be analyzed both mechanically and for performance. In operation, a flow rate of approximately 400 cubic feet of process gas per minute will be pulled through the scrubber tower by a fan positioned above the scrubber tower. The biological scrubber stage will operate in a countercurrent fashion with the process gas moving upward through the packed bed while irrigation liquid is sprayed over the top carrying acidic byproducts to the scrubber sump. The process gas will move upward through the biological scrubber stage and then upward through the chemical oxidation stage where it will mix with an oxidizing agent prior to exiting the scrubber tower outlet.

Irrigation fluid will be recirculated from the scrubber sump to the biological scrubber stage at a rate of about 5 to about 10 gallons per minute. Thus, the biological scrubber stage will be maintained at a relatively low pH level conducive to the growth of, for example, sulfur-oxidizing bacteria. A portion of the irrigation liquid collected in the scrubber sump will overflow via gravity to the reaction chamber where it will mix with sodium chlorite to generate chlorine dioxide in situ for delivery to the chemical oxidation scrubber stage. Sparging within the reaction chamber will facilitate release of chlorine dioxide to the vapor phase. The reaction chamber will include a drain through which about 1 to about 1.5 gallons of reaction liquid will be drained per minute carrying various waste products. The rate of drainage, as well as baffles within the reaction chamber, will control residence time within the reaction chamber. Fresh makeup water will be added either to the scrubber sump or recirculation line to maintain a desired volume of irrigation liquid and to generally control the pH level of irrigation liquid supplied to the biological scrubber stage.

The concentration of odorous constituents at the scrubber outlet will be monitored. Data collected during the trial program will be analyzed at various intervals such that operational parameters may be adjusted for optimization. For example, if the concentration of hydrogen sulfide at the scrubber outlet is higher than desired, then the residence time within the reaction chamber and/or the dosing of sodium chlorite to the reaction chamber may be increased to deliver more chlorine dioxide to the chemical oxidation scrubber stage. The gas treatment system is expected to be greater than 95% efficient, and preferably at least 99%, in removing a variety of odorous constituents, including hydrogen sulfide, from the process gas stream.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims.

Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the systems and techniques of the invention are used. Those skilled in the art should also recognize, or be able to ascertain, using no more than routine experimentation, equivalents to the specific embodiments of the invention. It is therefore to be understood that the embodiments described herein are presented by way of example only and that, within the scope of the appended claims and equivalents thereto, the invention may be practiced otherwise than as specifically described.

What is claimed is:

1. A biochemical gas treatment system, comprising:
   a scrubber comprising:
      a process gas inlet,
      a treated gas outlet,
      a biological scrubber stage,
      a chemical oxidation scrubber stage,
      an irrigation source configured to provide irrigation fluid to the biological scrubber stage, and
      a scrubber sump constructed and arranged to collect irrigation fluid from the biological scrubber stage;
   a reaction chamber having a first inlet fluidly connected to an outlet of the scrubber sump, and an outlet fluidly connected to the chemical oxidation scrubber stage; and
   a source of a metal chlorite fluidly connected to a second inlet of the reaction chamber.

2. The system of claim 1, wherein the chemical oxidation scrubber stage is positioned downstream of the biological scrubber stage.

3. The system of claim 1, wherein the metal chlorite comprises sodium chlorite.

4. The system of claim 1, further comprising means for regulating addition of a reactant from the reactant source to the reaction chamber.

5. The system of claim 1, wherein the reaction chamber further comprises means for controlling a holding volume of the reaction chamber.

6. The system of claim 5, wherein the reaction chamber further comprises a baffle.

7. The system of claim 1, further comprising a sparger in fluid communication with the reaction chamber.

8. The system of claim 7, wherein the sparger is configured to deliver treated gas to the reaction chamber.

9. The system of claim 1, further comprising a valve configured to regulate flow of an oxidizing agent from the reaction chamber to the chemical oxidation stage.

10. The system of claim 9, wherein the oxidizing agent comprises chlorine dioxide.

11. The system of claim 9, further comprising a controller in communication with the valve to control an amount of oxidizing agent delivered to the chemical oxidation stage from the reaction chamber.

12. The system of claim 1, wherein the chemical oxidation stage comprises an absorptive layer proximate to the biological scrubber stage.

13. The system of claim 1, further comprising an irrigation source fluidly connected to the biological scrubber stage.

14. The system of claim 13, further comprising a nutrient reservoir fluidly connected to one or more of the scrubber sump and the irrigation source.

15. The system of claim 1, further comprising a recirculation system fluidly connecting the scrubber sump to the biological scrubber stage.

16. The system of claim 1, further comprising a polishing system fluidly connected to the treated gas outlet of the scrubber.

17. The system of claim 1, further comprising a controller configured to regulate dosing of a reactant from the reactant source to the reaction chamber.

18. The system of claim 17, further comprising a pH sensor in communication with the controller disposed to monitor a pH level of a liquid in the scrubber sump.

19. The system of claim 17, further comprising a pH sensor in communication with the controller disposed to monitor a pH level of a liquid in the reaction chamber.

20. The system of claim 17, further comprising a flow meter in communication with the controller disposed to monitor a process gas flow rate at the process gas inlet.

21. A method of modifying an existing biological gas treatment system having a treated gas outlet and a sump, comprising:
   connecting a chemical oxidation stage to the treated gas outlet of the biological gas treatment system;
   connecting a first inlet of a reaction chamber to the sump of the biological gas treatment system;
   connecting a second inlet of the reaction chamber to a source of a metal chlorite; and
   connecting an outlet of the reaction chamber to an inlet of the chemical oxidation stage.

22. The method of claim 21, further comprising providing a sparger in fluid communication with the reaction chamber.

23. The method of claim 21, further comprising providing a controller configured to regulate a flow of reactant to the reaction chamber.

24. The method of claim 23, further comprising providing a pH sensor in communication with the controller configured to monitor a pH level of a liquid in the reaction chamber.

* * * * *